Feb. 19, 1946.   H. J. FRAMHEIN   2,395,323
INDUSTRIAL TRUCK
Filed Dec. 30, 1943    4 Sheets-Sheet 1

INVENTOR
H. J. Framhein
BY
H. H. Golden
ATTORNEY

Feb. 19, 1946.  H. J. FRAMHEIN  2,395,323
INDUSTRIAL TRUCK
Filed Dec. 30, 1943  4 Sheets-Sheet 2

INVENTOR
H. J. Framhein
BY
A. H. Golden
ATTORNEY

Feb. 19, 1946. H. J. FRAMHEIN 2,395,323
INDUSTRIAL TRUCK
Filed Dec. 30, 1943 4 Sheets-Sheet 3

INVENTOR
H. J. Framhein
BY
A. H. Golden
ATTORNEY

Feb. 19, 1946.  H. J. FRAMHEIN  2,395,323
INDUSTRIAL TRUCK
Filed Dec. 30, 1943   4 Sheets-Sheet 4

INVENTOR
H. J. Framhein
BY
A. H. Golden
ATTORNEY

Patented Feb. 19, 1946

2,395,323

UNITED STATES PATENT OFFICE 2,395,323

INDUSTRIAL TRUCK

Herbert J. Framhein, Chicago, Ill., assignor to The Yale & Towne Manufacturing Company, Stamford, Conn., a corporation of Connecticut Application December 30, 1943, Serial No. 516,170

3 Claims. (Cl. 180—65)

This invention relates to an industrial truck of the motorized type, equipped with an electric motor and battery for imparting traction to the truck, and with the motor being controlled by the steering handle of the truck. A truck of the particular class is illustrated in my Patent No. 2,327,583.

In trucks of the class disclosed in my patent, the operator walks as the truck moves, and controls the speed of the truck through the steering handle as has been outlined. In the truck that I shall show and describe in this application, there is provided a traction motor and a battery for driving the truck, and the truck is further provided with an operator's platform so that the operator may ride with the load. Those skilled in the art will fully appreciate that operator riding industrial trucks are well known in the art, and that my invention cannot therefore be considered as broadly contributing a truck of the particular type. However, my invention does contribute to the art a truck that is new and novel, is easy and safe to operate, is light, and yet well constructed.

One feature of my invention resides in the use of a novel form of steering and traction head that is rotatable as a unit relatively to the frame of the truck. A further feature of my invention resides in the construction of the steering and traction head whereby there is provided a differential drive for opposed axles, the differential drive and axles being rotatable with the steering and traction head as a unit. Through this feature of my invention I obtain a truck of wide base and great stability.

A further feature of the invention resides in the novel control mechanism for controlling the direction and movement of the truck. As a further feature of this portion of my invention, the driving motor is controlled by the foot of the operator and also by the hands of the operator applied to the steering mechanism. As a further detailed feature of this portion of my invention, the actuation of the truck motor is dependent upon the operation of control mechanism on the steering handle as well as the foot operated treadle.

A still further feature of the invention resides in the use of a steering member or handle fixed to the steering and traction head.

I have thus outlined the more important features of my invention in order that my contribution to the art may be better understood, and in order that the relation of my contribution to the prior art may be better comprehended. I do believe that my contribution is a broad and valuable one and that I am entitled to patent claims that will prevent newcomers in the field from utilizing my contribution to the art with such variations in physical structure as will readily occur to those skilled in the art. Also, while I have described generally several important features of my invention, there are other important features that will be described particularly in the specification and will be claimed in the claims appended hereto.

Referring now to the drawings,

Fig. 5 is a wiring diagram that is utilized in the truck.

Figure 1:
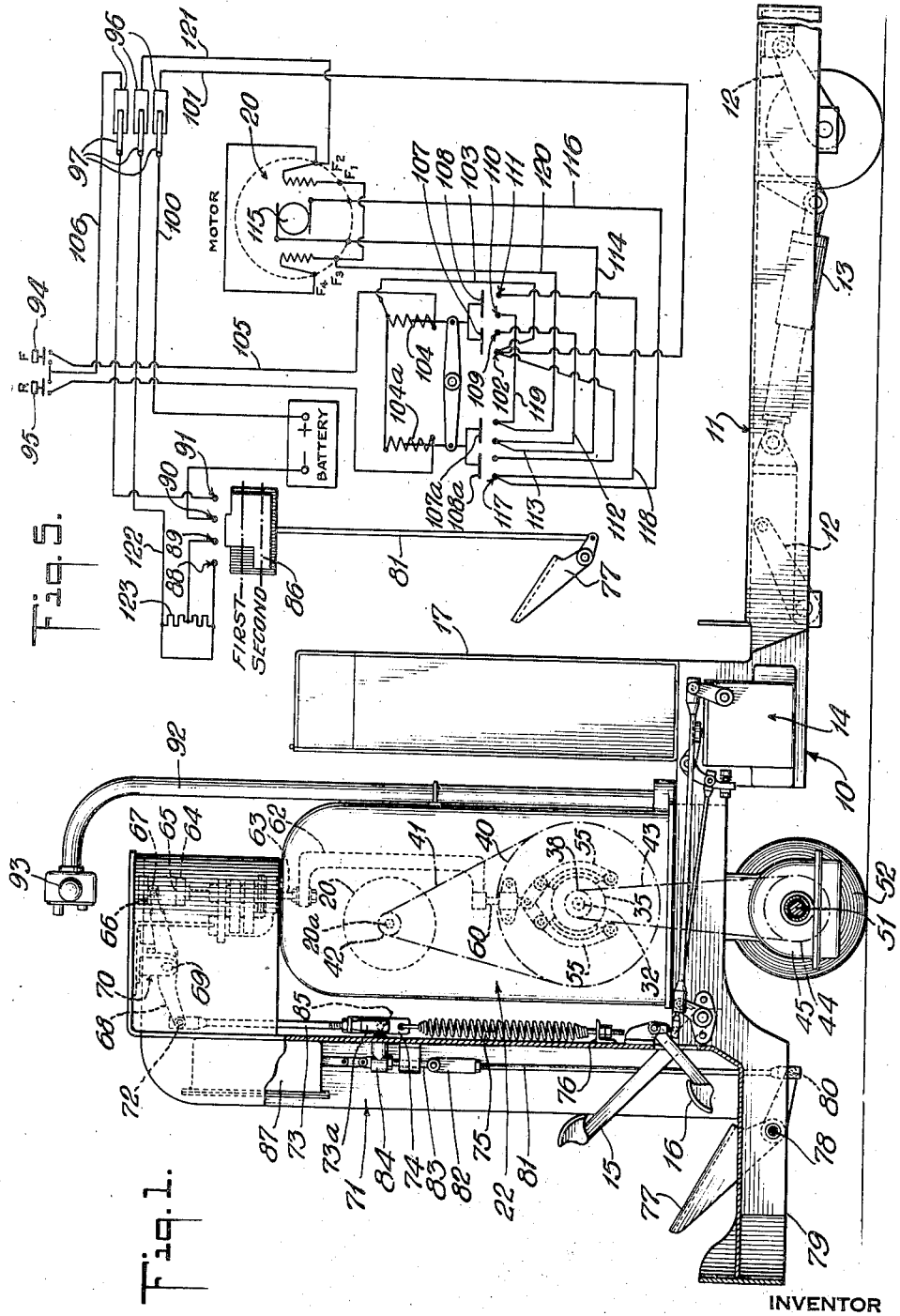
Fig. 1 is a vertical view of the truck of my invention.
Figure 2:
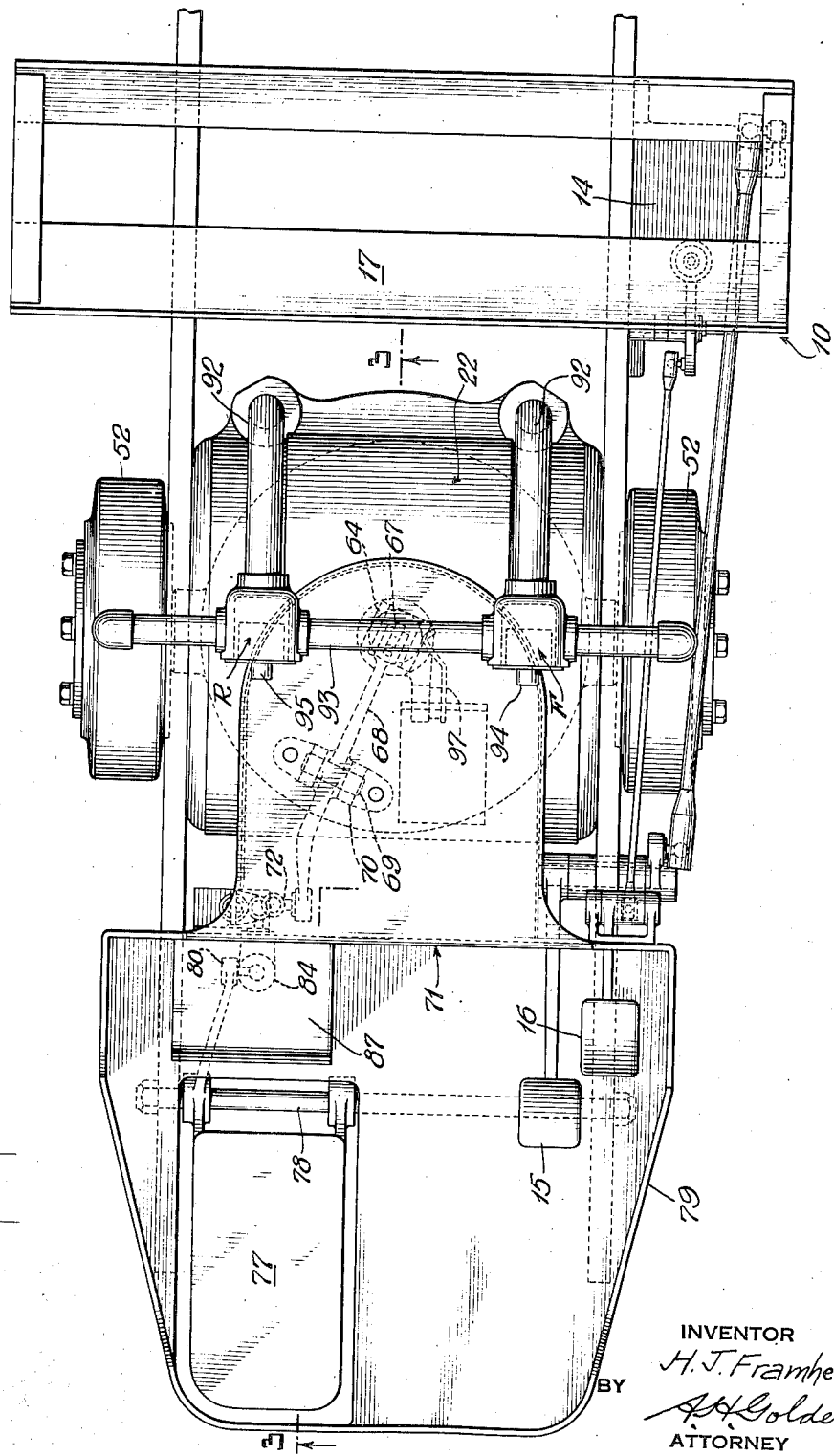
Fig. 2 is a view looking downwardly on the forward end of the truck of Fig. 1.

Referring now more particularly to the drawings, and especially Fig. 1, I illustrate there a truck of the double frame type. In other words, the truck I prefer to utilize has a main frame 10 and an elevating platform 11 adapted to be elevated relatively to the main frame 10. My invention is of course applicable to trucks of the single frame type, and I have shown the particular double frame type merely as one example of a truck to which my invention may be applied.

The elevating platform 11 is pivoted through links 12 to the main frame 10 and may be raised by the operation of the lifting ram 13. The ram 13 is actuated upon the pumping of fluid thereto by the pump 14 through the operation of the treadle 15. A second treadle 16 controls the lowering of the elevating platform. This structure is all well known in the art and per se forms no part of my invention.

The main frame of the truck carries a battery compartment 17 within which is carried a battery shown diagrammatically in Fig. 5 and used to supply power to a traction motor 20. The traction motor 20 is mounted on a suitable bracket 21 which forms an integral part of what I term a traction and steering head 22. This steering and traction head 22 is formed of a lower bearing portion 23 (Fig. 3) and an upper bearing portion 24, both circular in general form and having circular raceways 25 and 26 for cooperation with ball bearings 27. The ball bearings 27 are carried in a circular raceway 28 formed in a circular bearing member 29 that is an integral part of the main frame 10 of the truck. The bearing members 23 and 24 are held together by a series of bolts and nuts 30 and through the ball bearings 27 are held not only for rotation as a unit relatively to the main frame bearing member 29, but also against vertical disengagement therefrom.

Figure 4:
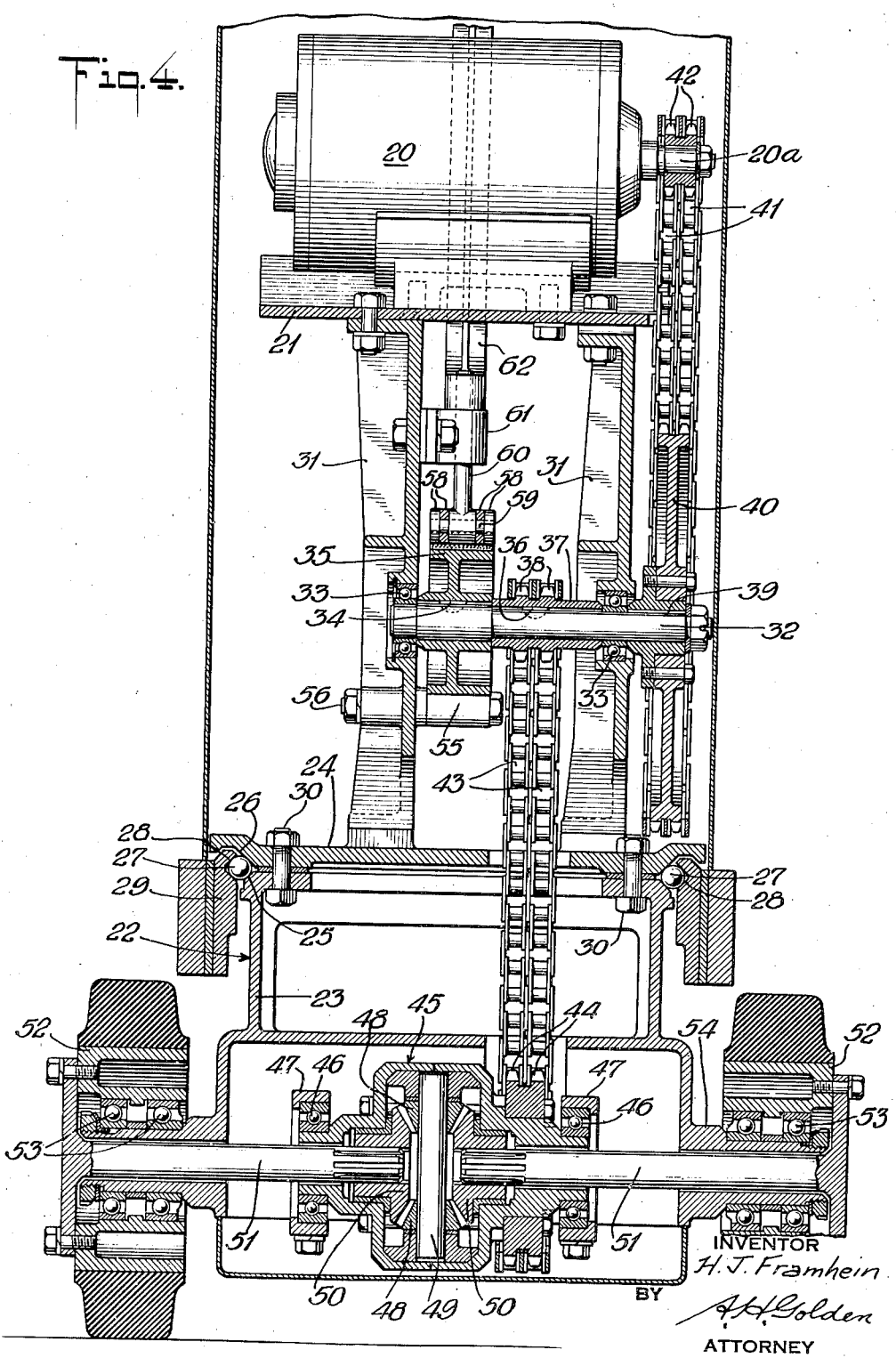
Fig. 4 is a vertical section taken along lines 4—4 of Fig. 3.

Referring now to Fig. 4, it will be noted that extending upwardly from the upper bearing member 24 of the steering and traction head 22 are a pair of standards 31 secured in reinforcing relation to the bracket 21 on which is supported the traction motor 20. A shaft 32 is mounted in bearings 33 of the standards 31 and has keyed thereto at 34 a brake drum 35. At 36 there is keyed to the shaft 32 a sleeve 37 carrying a pair of sprockets 38. At 39 there is keyed to the shaft 32 a large double sprocket 40 that is driven by a pair of sprocket chains 41 in engagement with a pair of sprockets 42 on the shaft 20a of motor 20. It is readily seen of course that the motor 20 will drive the shaft 32, and through the sprockets 38 carried on the said shaft will actuate a pair of chains 43.

The chains 43 are in turn in driving engagement with a pair of sprockets 44 that are secured to form integral parts of a differential housing 45. This differential housing 45 is rotatable on ball bearings 46 housed in brackets 47 that are formed as part of the casting of the lower bearing member 23 of the steering and traction head 22. The differential housing 45 is of the usual type used in the automotive field, and rotates a pair of pinions 48 mounted on the bearing rod 49. These pinions rotate one or both of the beveled gears 50 splined to opposed axles 51, and the axles 51 are secured to wheels 52 in a manner which is fully and clearly indicated in Fig. 4. The wheels 52 are rotatable about ball bearings 53 relatively to extensions 54 of the casting forming the lower bearing member 23 of the steering and traction head 22.

From the description so far given of the steering and traction head 22, it is now appreciated that that head comprises upper and lower bearing member 24 and 23 respectively, secured to one another by a series of bolts 30 for integral rotation on ball bearings 27 relatively to the main frame of the truck. It is further obvious that through the motor 20 and the series of chains and sprockets the differential housing 45 is rotated and imparts rotation to the wheels 52 in accordance with the driving principle of a differential mechanism.

Figure 3:
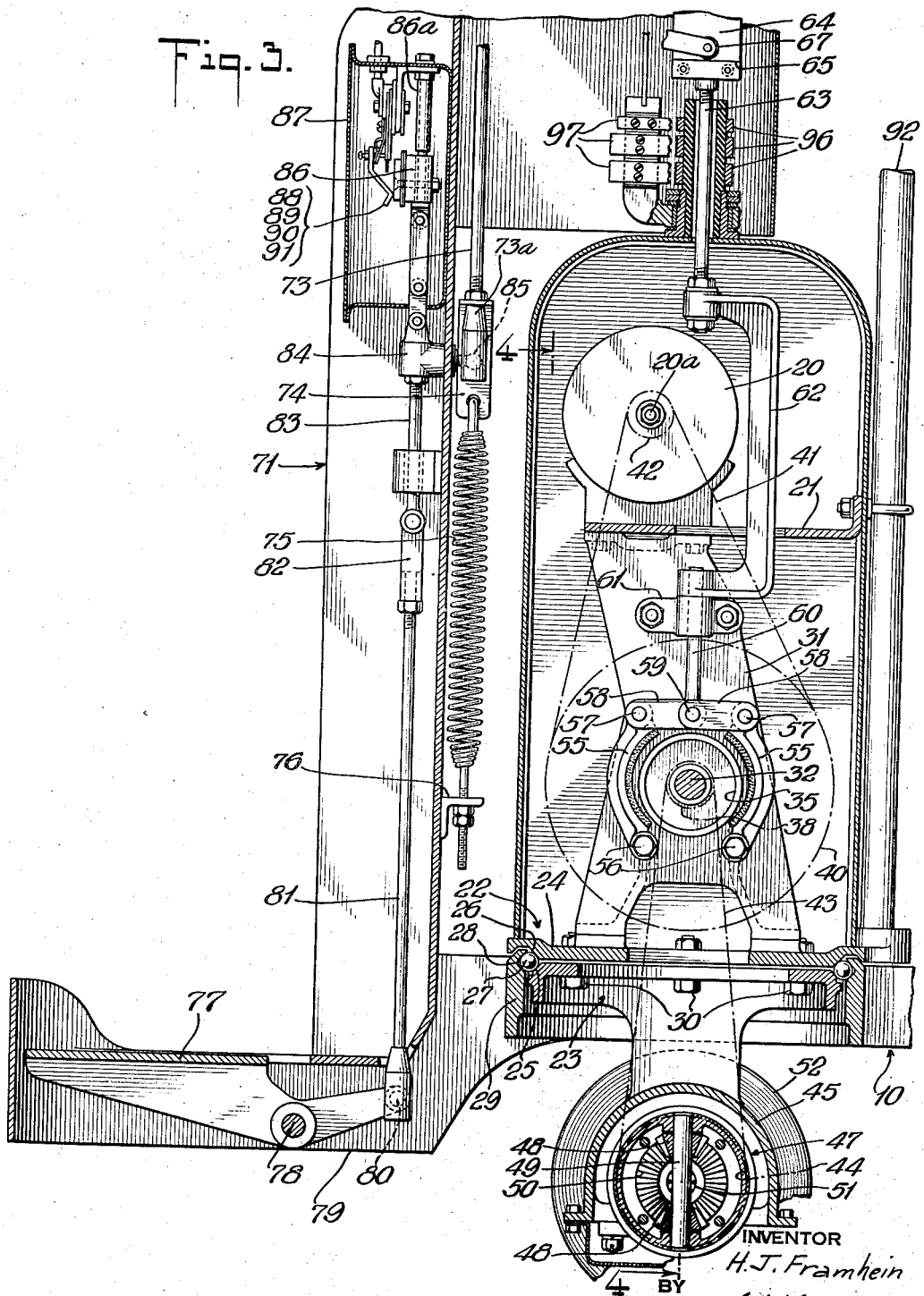
Fig. 3 is a vertical section along lines 3—3 of Fig. 2.

As was earlier indicated, the shaft 32 of the drive mechanism carries a brake drum 35. As best shown in Fig. 3, a pair of brake shoes 55 are pivoted on pivots 56 secured to one of the standards 31. These brake shoes 55 are further pivoted at 57 to short levers 58 that are in turn pivoted at 59 to a vertical rod 60. This vertical rod 60 is adapted for vertical movement relatively to a bearing 61 secured to one of the standards 31 and is adapted for such vertical movement through a U bar 62 secured thereto. The U bar 62 is in turn fixed to a rod 63 that carries at its upper end a part 64 equipped with upper and lower flanges 65 and 66. The flanges 65 and 66 are mounted in the steering axis of the head 22 and are adapted for cooperation with a roller 67 in all steering positions of the steering and traction head. Roller 67 is carried on the end of a lever 68 pivoted at 69 to a bracket 70, the bracket 70 being of course part of the main frame 10 of the truck and secured to the standard 71 of the front end of the truck, as best illustrated in Fig. 1.

The lever 68 is pivoted at 72 to a rod 73, and as best illustrated in Fig. 3 the rod is secured to a stamping 74 that is normally urged downwardly by a spring 75 secured to stamping 74 at one end, and to a bracket 76 of the standard 71 at its other end. It is of course readily appreciated that when the parts are in their position of Fig. 1, the spring 75 urges the several rods and levers to maintain the brake shoes 55 against the drum 35 thereby locking the traction and steering wheels 52 against movement. For releasing the brake I utilize a treadle 77 pivoted at 78 to an extension 79 of the main frame, the extension 79 serving as an operator's platform. While I prefer that the operator stand at the end of the truck, it is of course appreciated that I may change the location of the platform, and may provide a seat for the operator.

Pivoted at 80 to the treadle 77 is a rod 81 that extends vertically into engagement with a further rod 82 that is in turn secured to a rod 83 fastened to a connector 84. The connector 84 has a ball and socket connection at 85 with a part 73a secured as an integral portion of the rod 73. By moving the treadle 77 from the position of Fig. 1 to the position of Fig. 3, the spring 75 is stressed and the parts are moved to rotate the brake shoes 55 about the pivots 56 and out of braking relation to the brake drum 35. This is of course the position of the parts in Fig. 3. It will now be readily appreciated how the brake is actuated, and it will further be appreciated that the brake will be so actuated in all steering positions of head 22.

The treadle 77 is used not only to release the brake, but to control the motor drive of the truck. Thus, the connector 84 is suitably secured to a controller segment 86 that is mounted for vertical sliding movement on bearings 86a in the controller casing 87, and relatively to a series of contact fingers 88, 89, 90 and 91 shown diagrammatically in Fig. 5. At this point it may be said that when the treadle 77 is depressed it moves the controller segment 86 vertically upwardly into first the position relatively to fingers 88, 89, 90 and 91 indicated on the line marked First in Fig. 5. This is the first or low speed position of the controller as those skilled in the art will appreciate. Thereafter, the controller segment 86 will move to the relative position corresponding to the line marked Second, or to the second speed position.

For rotating the steering and traction head 22 relatively to the frame 10 of the truck I utilize a steering apparatus comprising a pair of vertical bars 92 secured as integral parts of the steering and traction head 22 as is well illustrated in the drawings. The bars 92 are preferably tubular or hollow, as is also the horizontal handle bar 93 connecting the bars 92, for the housing of wires extending from forward and reverse switches F and R that are secured in bar 93 and are actuated by push buttons 94 and 95.

For transmitting electric current to the motor from the battery in all rotated positions of the steering and lifting head 22, I utilize the series of collector rings 96 best shown in Fig. 3, and maintained in contact with a series of brushes 97. The collector rings are of course mounted with their centers in the steering axis of the steering and lifting head 22 and about the rod 63 which traverses their centers. The means whereby the collector rings 96 and the contact fingers 97 are secured in place are well illustrated in the drawings and need not be described in further detail here.

As was earlier set forth generally in this specification, it is necessary that the foot treadle 77 be depressed in order that the motor 20 be actuated. It is also necessary that one or the other of the switches F and R be closed through the operation of the push buttons 94 and 95 as a requisite to the actuation of the motor 20. Thus, it is a feature of my invention that the operator of the truck must depress the push button 94 of the switch F as well as depress the treadle 77 if he desires the truck to go forward. He must close the switch R through the depression of the push button 95, as well as depress the treadle 77 if he wishes the truck to move rearwardly. Because of this relationship of the controls, the operator can stop the truck by lifting his foot from the treadle 77, or by merely releasing one or the other of the push buttons. He therefore has a dual safety control that is extremely important. Moreover, because of the relationship of the controls, it is very easy for an operator to learn how to drive the truck, since he has merely to depress the treadle 77 and depress one or the other of the push buttons 94 and 95 on the handle bar 93 to actuate the motor 20. He can of course readily steer the truck while maintaining one or the other of the push buttons 94, 95 depressed, all as will be quite apparent.

I shall now describe just how the treadle 77 and the switches R and F, controlled by push buttons 94, 95, control the circuit of the motor 20. For this purpose I shall refer to the wiring diagram shown in Fig. 5, where the wiring circuit is drawn in that condition in which it is found when the treadle 77 is up, and the push buttons 94, 95 are in open circuit position. Should the operator wish to go forward he will depress the push button 94 closing the circuit at forward switch F. He will also depress the treadle 77 so as to raise the controller segment 86 to the line of its first position relatively to fingers 88—91. A circuit will then be closed from the plus side of the battery through conductor 100, a brush 97 and a corresponding segment 96, conductor 101, contact 102, conductor 103, contactor coil 104, conductor 105, the forward switch F, conductor 106, a segment 96 and brush 97, contact finger 91, segment 86, finger 90, and to the negative side of the battery.

The energizing of the contactor coil 104 will bring bridging segments 107 and 108 into bridging relation to contacts 102, 109, 110 and 111. This will effect the closing of the motor circuit as follows. From the plus side of the battery through conductor 100, a brush 97, and segment 96, conductor 101, contact 102, bridging segment 107, contact 109, conductor 112, conductor 113, conductor 114, through the armature 115 of the motor, conductor 116, contact 117; then conductor 118 to contact 111, across bridging segment 108 to contact 110, the conductor 119, conductor 120, through the two fields F1, F2 and F3, F4 in parallel, conductor 121, a commutator segment 96 and a brush 97, conductor 122, a part of resistance 123, contact 89, controller segment 86, contact 90 and to the negative side of the battery. The motor will now be in first speed until the operator depresses further the treadle 77 shunting out the resistance 123.

Should it be desired to run the truck in reverse, the same action will take place except that with treadle 77 depressed, the reversing switch R will be closed through push button 95. This will of course effect the closing of the circuit of the contactor relay 104a and the movement downwardly of the bridging segments 107a and 108a, instead of the moving downwardly of the bridging segments 107 and 108. It is thought unnecessary to describe in detail the several circuits that will be closed for the reversing of the motor since the explanation already given of the forward speed circuit is believed adequate.

I believe that the operation and construction of my invention, the interrelation of the controls, and the effectiveness of the mechanism, will now be apparent to those skilled in the art.

I now claim:

1. In a truck of the class described, a frame having an operator's platform, a motorized traction and steering head, means mounting said traction and steering head for steering rotation relatively to said frame, an electric traction motor mounted on said traction and steering head to furnish the tractive power, a foot treadle mounted for movement on said frame and movable by the foot of an operator on said platform, an electric circuit for said electric traction motor, means whereby the foot treadle controls the electric circuit of said motor whereby when said treadle is depressed said circuit is closed at one point for the energizing of said motor, directional switches for said circuit the particular positioning of which is a requisite to the energizing of said motor, a pair of steering handles secured as an integral part of said steering head and positioned for access by the hands of an operator on said platform whereby to rotate said steering head, and manually operated means on said handles for actuating said directional switches.

2. In a truck of the class described, a frame having an operator's platform, a motorized traction and steering head, means mounting said traction and steering head for steering rotation relatively to said frame, an electric traction motor mounted on said traction and steering head to furnish the tractive power, a foot treadle mounted for movement on said frame and movable by the foot of an operator on said platform, an electric circuit for said electric traction motor, means whereby the foot treadle controls the electric circuit of said motor whereby when said treadle is depressed said circuit is closed at one point for the energizing of said motor, directional switches for said circuit the particular positioning of which is a requisite to the energizing of said motor, a pair of steering handles for rotating said steering head, and manually operated means on said handles for actuating said directional switches.

3. In a truck of the class described, a frame having an operator's platform, a motorized traction and steering head, means mounting said traction and steering head for steering rotation relatively to said frame, an electric traction motor mounted on said traction and steering head to furnish the tractive power, a foot treadle mounted for movement on said frame and movable by the foot of an operator on said platform, an electric circuit for said electric traction motor, means whereby the foot treadle controls the electric circuit of said motor whereby when said treadle is depressed said circuit is closed at one point for the energizing of said motor, directional switches for said circuit the particular positioning of which is a requisite to the energizing of said motor, a right and a left steering handle secured as an integral part of said steering head for access by the hands of an operator on said platform whereby to rotate said steering head, and a manually operated means on said right handle and on said left handle for actuating said directional switches.

HERBERT J. FRAMHEIN.